US008888360B2

(12) United States Patent
Gurary et al.

(10) Patent No.: US 8,888,360 B2
(45) Date of Patent: Nov. 18, 2014

(54) METHODS AND SYSTEMS FOR IN-SITU PYROMETER CALIBRATION

(75) Inventors: Alexander I. Gurary, Bridgewater, NJ (US); Vadim Boguslavskiy, Princeton, NJ (US); Sandeep Krishnan, Piscataway, NJ (US); Matthew King, Montville, NJ (US)

(73) Assignee: Veeco Instruments Inc., Plainview, NY (US)

( * ) Notice: Subject to any disclaimer, the term of this patent is extended or adjusted under 35 U.S.C. 154(b) by 173 days.

(21) Appl. No.: 13/331,112

(22) Filed: Dec. 20, 2011

(65) Prior Publication Data
US 2012/0170609 A1 Jul. 5, 2012

Related U.S. Application Data

(60) Provisional application No. 61/428,494, filed on Dec. 30, 2010.

(51) Int. Cl.
*G01K 15/00* (2006.01)
*G01K 13/12* (2006.01)
*G01K 1/00* (2006.01)
*G01J 5/00* (2006.01)

(52) U.S. Cl.
CPC ............. *G01J 5/0003* (2013.01); *G01J 5/0007* (2013.01); *G01J 2005/0048* (2013.01)
USPC .................................... 374/2; 374/1; 374/100

(58) Field of Classification Search
USPC .................................. 374/2, 1, 100
See application file for complete search history.

(56) References Cited

U.S. PATENT DOCUMENTS

| 5,790,750 A | 8/1998 | Anderson |
| 6,349,270 B1 | 2/2002 | Gurary et al. |

(Continued)

FOREIGN PATENT DOCUMENTS

| DE | 102007042779 A1 | 4/2009 |
| KR | 20110077462 A | 7/2011 |
| KR | 20120062921 A | 6/2012 |
| WO | 0226435 A1 | 4/2002 |

OTHER PUBLICATIONS

International Search Report and Written Opinion for PCT/US2011/066831 dated Apr. 12, 2012.

(Continued)

*Primary Examiner* — Lisa Caputo
*Assistant Examiner* — Jamel Williams
(74) *Attorney, Agent, or Firm* — Lerner, David, Littenberg, Krumholz & Mentlik, LLP

(57) ABSTRACT

A method of in-situ pyrometer calibration for a wafer treatment reactor such as a chemical vapor deposition reactor desirably includes the steps of positioning a calibrating pyrometer at a first calibrating position and heating the reactor until the reactor reaches a pyrometer calibration temperature. The method desirably further includes rotating the support element about the rotational axis, and while the support element is rotating about the rotational axis, obtaining first operating temperature measurements from a first operating pyrometer installed at a first operating position, and obtaining first calibrating temperature measurements from the calibration pyrometer. Both the calibrating pyrometer and the first operating pyrometer desirably are adapted to receive radiation from a first portion of a wafer support element at a first radial distance from a rotational axis of the wafer support element.

24 Claims, 1 Drawing Sheet

(56) References Cited

U.S. PATENT DOCUMENTS

| | | | | |
|---|---|---|---|---|
| 6,492,625 | B1* | 12/2002 | Boguslavskiy et al. | 219/486 |
| 6,818,894 | B2* | 11/2004 | Takoudis et al. | 250/339.08 |
| 7,276,124 | B2 | 10/2007 | Gurary et al. | |
| 2003/0236642 | A1* | 12/2003 | Timans | 702/99 |
| 2006/0171442 | A1* | 8/2006 | Volf et al. | 374/1 |
| 2007/0291816 | A1* | 12/2007 | Volf et al. | 374/1 |
| 2009/0155028 | A1 | 6/2009 | Boguslavskiy et al. | |

OTHER PUBLICATIONS

Written Opinion of the International Preliminary Examining Authority for Application No. PCT/US2011/066831 dated Jan. 8, 2013.

International Search Report and Written Opinion for Application No. PCT/US2013/047010 dated Sep. 27, 2013.

Taiwan Office Action for Application No. 100149858 dated Dec. 18, 2013.

* cited by examiner

METHODS AND SYSTEMS FOR IN-SITU PYROMETER CALIBRATION

CROSS-REFERENCE TO RELATED APPLICATIONS

The present application claims the benefit of the filing date of U.S. Provisional Patent Application Ser. No. 61/428,494, filed Dec. 30, 2010, the disclosure of which is hereby incorporated by reference herein.

BACKGROUND OF THE INVENTION

The present invention relates to wafer processing apparatus, to pyrometer calibration systems for use in such processing apparatus, and to methods of in-situ pyrometer calibration.

Many semiconductor devices are formed by processes performed on a substrate. The substrate typically is a slab of a crystalline material, commonly referred to as a "wafer." Typically, a wafer is formed by growing a large crystal and slicing the crystal into the shape of a disc. One common process performed on such a wafer is epitaxial growth.

For example, devices formed from compound semiconductors such as III-V semiconductors typically are formed by growing successive layers of the compound semiconductor using metal organic chemical vapor deposition or "MOCVD." In this process, the wafers are exposed to a combination of gases, typically including a metal organic compound as a source of a group III metal, and also including a source of a group V element which flow over the surface of the wafer while the wafer is maintained at an elevated temperature. Typically, the metal organic compound and group V source are combined with a carrier gas which does not participate appreciably in the reaction as, for example, nitrogen. One example of a III-V semiconductor is gallium nitride, which can be formed by reaction of an organo gallium compound and ammonia on a substrate having a suitable crystal lattice spacing, as for example, a sapphire wafer. Typically, the wafer is maintained at a temperature on the order of 500-1100° C. during deposition of gallium nitride and related compounds.

Composite devices can be fabricated by depositing numerous layers in succession on the surface of the wafer under slightly different reaction conditions, as for example, additions of other group III or group V elements to vary the crystal structure and bandgap of the semiconductor. For example, in a gallium nitride based semiconductor, indium, aluminum or both can be used in varying proportion to vary the bandgap of the semiconductor. Also, p-type or n-type dopants can be added to control the conductivity of each layer. After all of the semiconductor layers have been formed and, typically, after appropriate electric contacts have been applied, the wafer is cut into individual devices. Devices such as light-emitting diodes ("LEDs"), lasers, and other electronic and optoelectronic devices can be fabricated in this way.

In a typical chemical vapor deposition process, numerous wafers are held on a component commonly referred to as a wafer carrier so that a top surface of each wafer is exposed at the top surface of the wafer carrier. The wafer carrier is then placed into a reaction chamber and maintained at the desired temperature while the gas mixture flows over the surface of the wafer carrier. It is important to maintain uniform conditions at all points on the top surfaces of the various wafers on the carrier during the process. Minor variations in composition of the reactive gases and in the temperature of the wafer surfaces cause undesired variations in the properties of the resulting semiconductor devices.

For example, if a gallium indium nitride layer is deposited, variations in wafer surface temperature or concentrations of reactive gasses will cause variations in the composition and bandgap of the deposited layer. Because indium has a relatively high vapor pressure, the deposited layer will have a lower proportion of indium and a greater bandgap in those regions of the wafer where the surface temperature is higher. If the deposited layer is an active, light-emitting layer of an LED structure, the emission wavelength of the LEDs formed from the wafer will also vary. Thus, considerable effort has been devoted in the art heretofore towards maintaining uniform conditions.

One type of CVD apparatus which has been widely accepted in the industry uses a wafer carrier in the form of a large disc with numerous wafer-holding regions, each adapted to hold one wafer. The wafer carrier is supported on a spindle within the reaction chamber so that the top surface of the wafer carrier having the exposed surfaces of the wafers faces upwardly toward a gas distribution element. While the spindle is rotated, the gas is directed downwardly onto the top surface of the wafer carrier and flows across the top surface toward the periphery of the wafer carrier. The used gas is evacuated from the reaction chamber through exhaust ports disposed below the wafer carrier and distributed around the axis of the spindle, typically near the periphery of the chamber.

The wafer carrier is maintained at the desired elevated temperature by heating elements, typically electrical resistive heating elements disposed below the bottom surface of the wafer carrier. These heating elements are maintained at a temperature above the desired temperature of the wafer surfaces, whereas the gas distribution element typically is maintained at a temperature well below the desired reaction temperature so as to prevent premature reaction of the gases. Therefore, heat is transferred from the heating elements to the bottom surface of the wafer carrier and flows upwardly through the wafer carrier to the individual wafers.

In a conventional wafer treatment process, such as a chemical vapor deposition process or another operation using a rotating disc reactor for another purpose such as etching, the process temperature in the reaction chamber can be measured by one or more non-contact pyrometers that are adapted to measure the temperature of the wafer carrier and/or the wafers during processing. Such temperature measurements can be used as an input to help determine the control of the heating elements during processing of the wafers.

It is important to have repeatability of pyrometer temperature measurement between different CVD reactors in a manufacturing facility. High pyrometer repeatability across different CVD reactors can allow for the use of a single CVD process recipe across multiple reactors, greatly reducing production downtime that can occur if individual reactors have to be extensively tuned to produce consistent wafer characteristics among the reactors. A critical component of CVD reactor pyrometer repeatability is temperature-matching across multiple reactors, due to the high sensitivity of characteristics of the devices made in CVD reactors to the temperatures used in the CVD process. For example, where the devices made in the reactors are lasers or LEDs that include multiple quantum wells ("MQWs"), the wavelengths emitted by the MQWs are highly sensitive to the temperatures used in the CVD process. Consequently, it is necessary that pyrometers across multiple reactors control and bring these reactors to the same process temperatures.

However, it is typical to see a large variation in measured temperatures across multiple pyrometers. Typically, these pyrometers are periodically removed from the processing apparatus and calibrated to NIST-traceable black body furnaces, which can be disruptive for the production environment. Even after calibration, pyrometers can have a spread of +/−3° C. due to variation in calibration of these black body furnaces, as well as instability and drift of the furnace over time, such that the actual temperature of the wafer carrier and the in-process wafers can become uncertain. Additional sources of pyrometer measured temperature variation can include variable installation of the pyrometers on the reactor, which can affect the pyrometer temperature reading, and drift of the pyrometer temperature reading output over time. Such measured temperature variations can make it difficult to use universal temperature control recipes on multiple MOCVD reactors, and the resulting uncertainty may require individual reactor system tuning to bring multiple reactors to same temperature control behavior.

Although considerable effort has been devoted in the art heretofore to optimization of such systems, still further improvement would be desirable. In particular, it would be desirable to provide a less disruptive temperature measurement system.

SUMMARY OF THE INVENTION

A method of in-situ pyrometer calibration for a wafer treatment reactor, and an in-situ pyrometer calibration system for a wafer treatment reactor are provided. One aspect of the invention provides a method of in-situ pyrometer calibration for a wafer treatment reactor such as a chemical vapor deposition reactor. The method desirably includes the steps of positioning a calibrating pyrometer at a first calibrating position and heating the reactor until the reactor reaches a pyrometer calibration temperature. The method desirably further includes rotating the support element about the rotational axis, and while the support element is rotating about the rotational axis, obtaining first operating temperature measurements from a first operating pyrometer installed at a first operating position, and obtaining first calibrating temperature measurements from the calibration pyrometer. Both the calibrating pyrometer and the first operating pyrometer desirably are adapted to receive radiation from a first portion of a wafer support element at a first radial distance from a rotational axis of the wafer support element.

In a particular embodiment, the steps of obtaining first operating temperature measurements and obtaining first calibrating temperature measurements can be performed simultaneously. In one example, all steps of the method can be performed without removing the first operating pyrometer from the reactor. In an exemplary embodiment, the steps of obtaining first operating temperature measurements and obtaining first calibrating temperature measurements can be performed during operation of the reactor to treat wafers. In a particular embodiment, the wafer support element can be a blank wafer carrier that does not have wafer-holding pockets or wafers thereon. In one example, the operation of the reactor to treat wafers can include chemical vapor deposition. In a particular example, the method can also include the step of adjusting calibration parameters of the first operating pyrometer based on the temperature measurements obtained from the first operating pyrometer and the calibration pyrometer.

In an exemplary embodiment, the method can also include the step of storing a look-up table in a memory of the wafer treatment reactor. The look-up table can include a mapping of at least some of the first operating temperature measurements with corresponding ones of the first calibrating temperature measurements. In one example, the pyrometer calibration temperature can be a first pyrometer calibration temperature, and the method can also include the steps of heating the reactor until the reactor reaches a second pyrometer calibration temperature, while the support element is rotating about the rotational axis, obtaining second operating temperature measurements from the first operating pyrometer, and while the support element is rotating about the rotational axis, obtaining second calibrating temperature measurements from the calibration pyrometer.

In one example, the method can also include the step of moving the calibrating pyrometer to a second calibrating position so that the calibrating pyrometer can be adapted to receive radiation from a second portion of the wafer support element at a second radial distance from the rotational axis of the wafer support element. The method can also include the step of, while the support element is rotating about the rotational axis, obtaining second operating temperature measurements from a second operating pyrometer installed at a second operating position so that the second operating pyrometer can be adapted to receive radiation from the second portion of the wafer support element at the second radial distance from the rotational axis of the wafer support element. The method can also include the step of, while the support element is rotating about the rotational axis, obtaining second calibrating temperature measurements from the calibration pyrometer.

In a particular embodiment, the method can also include the step of, before the step of obtaining second operating temperature measurements, adjusting calibration parameters of the first operating pyrometer based on the first operating temperature measurements and the first calibrating temperature measurements. The method can also include the step of, after the step of obtaining second calibrating temperature measurements, adjusting calibration parameters of the second operating pyrometer based on the second operating temperature measurements and the second calibrating temperature measurements. In one example, the method can also include the step of, after the step of obtaining second calibrating temperature measurements, adjusting calibration parameters of the first and second operating pyrometers based on the temperature measurements obtained from the operating pyrometers and the calibration pyrometer.

In an exemplary embodiment, the first and second operating pyrometers can be engaged in respective first and second operating optical viewports of the reactor. In a particular example, the positioning step can be performed such that the calibrating pyrometer can be engaged in a first calibrating optical viewport of the reactor. In a particular embodiment, the moving step can be performed such that the calibrating pyrometer can be engaged in a second calibrating optical viewport of the reactor. In an exemplary embodiment, the positioning step can be performed such that the calibrating pyrometer can be engaged in a radially-extensive calibrating optical viewport, and the moving step can be performed such that the calibrating pyrometer can be moved along the radially-extensive calibrating optical viewport from the first calibrating position to the second calibrating position. In an exemplary embodiment, the heating step can be performed by a multi-zone heating system for the wafer support element.

Another aspect of the invention provides an in-situ pyrometer calibration system for a wafer treatment reactor such as a chemical vapor deposition reactor. The system preferably includes a wafer support element having a rotational axis, a heating element for the wafer support element, a first operating pyrometer installed at a first operating position, and a calibrating pyrometer positioned at a first calibrating position. The first operating pyrometer can be adapted to receive radiation from a first portion of the wafer support element at a first radial distance from the rotational axis of the wafer support element. The calibrating pyrometer can be adapted to receive radiation from the first portion of the wafer support element at the first radial distance from the rotational axis of the wafer support element.

In a particular embodiment, the first operating pyrometer and the calibrating pyrometer can be adapted to simultaneously take temperature measurements from the first portion of the wafer support element at the first radial distance from the rotational axis of the wafer support element. In one example, the system can also include a second operating pyrometer installed at a second operating position so that the second operating pyrometer can be adapted to receive radiation from a second portion of the wafer support element at a second radial distance from the rotational axis of the wafer support element. The calibrating pyrometer can be adapted to be positioned at a second calibrating position so that the calibrating pyrometer in the second calibrating position can be adapted to receive radiation from the second portion of the wafer support element at the second radial distance from the rotational axis of the wafer support element.

In an exemplary embodiment, the system can also include first and second operating optical viewports, wherein the first and second operating pyrometers can be engaged in the respective first and second operating optical viewports. In a particular example, the system can also include first and second calibrating optical viewports, wherein the calibrating pyrometer can be adapted to be engaged in the first calibrating optical viewport when the calibrating pyrometer is positioned at the first calibrating position, and the calibrating pyrometer can be adapted to be engaged in the second calibrating optical viewport of the reactor when the calibrating pyrometer is positioned at the second calibrating position. In an exemplary embodiment, the system can also include a radially-extensive calibrating optical viewport, wherein the calibrating pyrometer can be adapted to slide within the radially-extensive calibrating optical viewport between the first and second calibrating positions. In a particular embodiment, heating element can be a multi-zone heating system.

DETAILED DESCRIPTION

Figure 1:
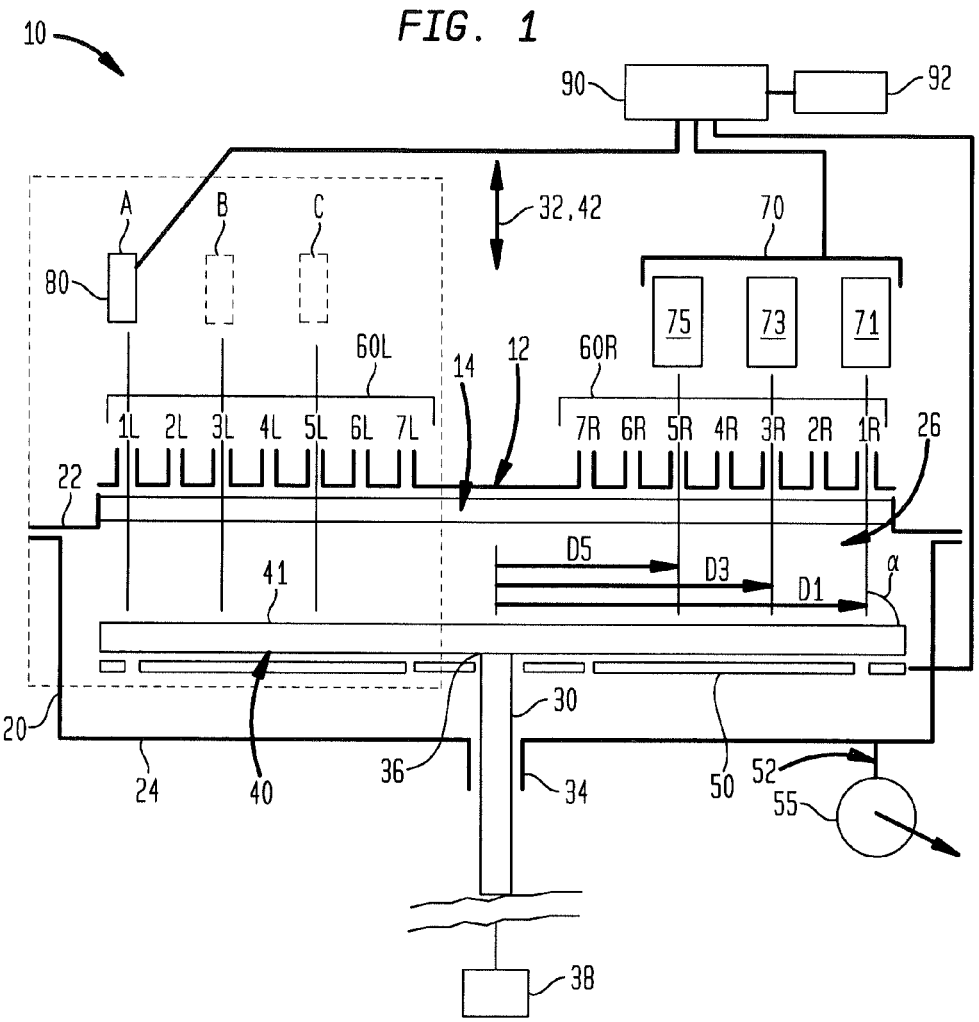
FIG. 1 is a sectional view depicting a chemical vapor deposition apparatus in accordance with one embodiment of the invention.

Referring to FIG. 1, a chemical vapor deposition apparatus 10 in accordance with one embodiment of the invention includes a reaction chamber 12 having a gas inlet manifold 14 arranged at one end of the chamber 12. The end of the chamber 12 having the gas inlet manifold 14 is referred to herein as the "top" end of the chamber 12. This end of the chamber typically, but not necessarily, is disposed at the top of the chamber in the normal gravitational frame of reference. Thus, the downward direction as used herein refers to the direction away from the gas inlet manifold 14; whereas the upward direction refers to the direction within the chamber, toward the gas inlet manifold 14, regardless of whether these directions are aligned with the gravitational upward and downward directions. Similarly, the "top" and "bottom" surfaces of elements are described herein with reference to the frame of reference of chamber 12 and manifold 14.

The chamber 12 has a cylindrical wall 20 that extends between a top flange 22 at the top end of the chamber and a base plate 24 at the bottom end of the chamber. The wall 20, the flange 22, and the base plate 24 define an air-tight sealed interior region 26 therebetween that can contain gasses emitted from the gas inlet manifold 14. Although the chamber 12 is shown as cylindrical, other embodiments can include a chamber having another shape, including, for example, a cone or other surface of revolution about a central axis 32, a square, a hexagon, an octagon, or any other appropriate shape.

The gas inlet manifold 14 is connected to sources for supplying process gases to be used in the wafer treatment process, such as a carrier gas and reactant gases such as a metalorganic compound and a source of a group V metal. In a typical chemical vapor deposition process, the carrier gas can be nitrogen, hydrogen, or a mixture of nitrogen and hydrogen, and hence the process gas at the top surface of a wafer carrier can be predominantly composed of nitrogen and/or hydrogen with some amount of the reactive gas components. The gas inlet manifold 14 is arranged to receive the various gases and direct a flow of process gasses generally in the downward direction.

The gas inlet manifold 14 can also be connected to a coolant system (not shown) arranged to circulate a liquid through the gas distribution element so as to maintain the temperature of the element at a desired temperature during operation. A similar coolant arrangement (not shown) can be provided for cooling the walls of the chamber 12.

The chamber 12 can also be provided with an entry opening (not shown) leading to an antechamber (not shown), and a moveable shutter (not shown) for closing and opening the entry opening. The shutter can be configured as disclosed, for example, in U.S. Pat. No. 7,276,124, the disclosure of which is hereby incorporated by reference herein.

A spindle 30 is arranged within the chamber so that the central axis 32 of the spindle 30 extends in the upward and downward directions. The spindle is mounted to the chamber by a conventional rotary pass-through device 34 incorporating bearings and seals (not shown) so that the spindle can rotate about the central axis 32, while maintaining a seal between the spindle 30 and the base plate 24 of the chamber 12. The spindle 30 has a fitting 36 at its top end, i.e., at the end of the spindle closest to the gas inlet manifold 14.

The spindle 30 is connected to a rotary drive mechanism 38 such as an electric motor drive, which is arranged to rotate the spindle about the central axis 32. The spindle 30 can also be provided with internal coolant passages extending generally in the axial directions of the spindle within the gas passageway. The internal coolant passages can be connected to a coolant source, so that a fluid coolant can be circulated by the source through the coolant passages and back to the coolant source.

A wafer carrier or wafer support element 40 is substantially in the form of a circular disc having a top surface 41 and a central axis 42. In the operative position shown in FIG. 1, the central axis 42 of the support element 40 is coincident with the axis 32 of the spindle. The support element 40 can be formed as a single piece or as a composite of plural pieces. For example, as disclosed in U.S. Published Patent Application No. 20090155028, the disclosure of which is hereby incorporated by reference herein, the support element 40 may include a hub defining a small region of the support element surrounding the central axis 42 and a larger portion defining the remainder of the disc-like body. In other embodiments (not shown), the support element 40 can have other shapes, including, for example, a square, a hexagon, or an octagon.

The support element 40 can be formed from materials that do not contaminate the CVD process and that can withstand the temperatures encountered in the process. For example, the larger portion of the support element 40 may be formed largely or entirely from materials such as graphite, silicon carbide, boron nitride, aluminum nitride, or other refractory materials. The support element 40 has generally planar upper and lower surfaces extending generally parallel to one another and generally perpendicular to the vertical rotational axis 42 of the support element. In one example, the support element 40 can be about 300 mm to about 700 mm in diameter.

The support element 40 can include recesses or platforms arranged circumferentially about the support element, each such recess or platform being configured to removably receive a disc-like wafer (not shown) and to hold such wafer during a MOCVD process such as that described below. Each wafer can be formed from a sapphire, silicon carbide, silicon, or other crystalline substrate. Typically, each wafer has a thickness which is small in comparison to the dimensions of its major surfaces. For example, a circular wafer about 2 inches (50 mm) in diameter may be about 430 μm thick or less. Each wafer can disposed on or adjacent the support element 40 with a top surface thereof facing upwardly, so that the top surface of the wafer is exposed at the top surface of the support element.

A heating element 50 is mounted within the chamber 12 and surrounds the spindle 30 below the fitting 36. The heating element 50 can transfer heat to the bottom surface of the support element 40, principally by radiant heat transfer. Heat applied to the bottom surface of the support element 40 can flow upwardly through the body of the support element to the top surface 41 thereof. Heat can pass upwardly to the bottom surface of each wafer held by the support element 40, and upwardly through the wafers and to the top surfaces thereof. Heat can be radiated from the top surfaces of the wafers to the colder elements of the process chamber 12 as, for example, to the walls 20 of the process chamber and to the gas inlet manifold 14. Heat can also be transferred from the top surfaces of the wafers to the process gas passing over these surfaces. In a particular embodiment, the heating element 50 can be a multi-zone heating element, whereby different portions of the support element 40 (e.g., a first annular portion located at a first radial distance from the central axis 32 of the spindle 30, and a second annular portion located at a second radial distance from the central axis) can be heated differently.

In an example embodiment, heat shields (not shown) can be provided below the heating element 50, for example, disposed parallel to the support element 40, to help direct heat from the heating element upwards towards the support element and not downwards towards the base plate 24 at the bottom end of the chamber 12.

The chamber 12 is also equipped with an exhaust system 52 arranged to remove spent gases from the interior region 26 of the chamber. The exhaust system 52 can include an exhaust manifold (not shown) at or near the bottom of the chamber 12. The exhaust manifold can be connected to a pump or other vacuum source that can be configured to carry spent gasses out of the reaction chamber 12.

A plurality of optical viewports 60L and 60R (collectively optical viewports 60) can be located at the top flange 22 of the chamber 12. Each viewport 60 can be adapted to receive a pyrometer (e.g., a pyrometer 70 or 80) for measuring temperature, or another non-contact measurement device such as a deflectometer for measuring curvature, a reflectometer for measuring growth rate, an ellipsometer, or a scanning device that can measure temperature across the entire radius of the support element 40. Each viewport 60 can be located at any radial distance from the central axis 32 of the spindle 30, and each viewport can be located at any angular location about the circumference of the top flange 22 of the chamber 12.

In the example embodiment shown in FIG. 1, there are seven viewports 60L at the left side of FIG. 1, including viewports 1L through 7L, each viewport 60L being located at a different radial distance from the central axis 32, and there are seven viewports 60R at the right side of FIG. 1, including viewports 1R through 7R, each viewport 60R being located at a different radial distance from the central axis 32. Each left-side viewport 1L through 7L is located at the same radial distance from the central axis 32 as the corresponding right-side viewport 1R through 7R. Although seven viewports 60L and 60R are shown in FIG. 1, in other embodiments, there can be any number of viewports 60L and 60R. For example, in a particular embodiment, there can be a single viewport 60L and a single viewport 60R. In another example, in the embodiment shown in FIG. 2, there can be one or more radially-extensive viewports 60L', as described below.

A plurality of operating pyrometers 70 can be installed into corresponding ones of the plurality of viewports 60. Each operating pyrometer 70 can be adapted to measure the temperature of the support element 40 and/or wafers supported thereon. Such temperature measurements can be used as an input to a control system (e.g., a control system 90) to help determine the control of the heating element 60 during processing of the wafers.

In the example embodiments shown, there are three operating pyrometers 70 installed into three corresponding ones of the viewports 60R. For example, the operating pyrometers 70 include operating pyrometers 71, 73, and 75 installed into respective viewports 1R, 3R, and 5R. In other embodiments, there can be any number of operating pyrometers 70, and each operating pyrometer can be installed into any of the viewports 60.

As shown, each of the operating pyrometers 70 is oriented such that it can measure the temperature of the support element 40 and/or wafers supported thereon at a corresponding radial distance from the vertical rotational axis 42 of the support element. In a particular embodiment wherein the heating element 50 is a multi-zone heating element, each of the operating pyrometers 70 can control the heating of a portion of the heating element 50 that may be underlying a corresponding zone or portion of the support element 40. For example, each operating pyrometer 70 can be used to control the temperature of an annular portion of the support element 40 at a particular radial distance from the central axis 42.

For example, each of the pyrometers 71, 73, and 75 can measure the temperature of the support element 40 at a corresponding radial distance D1, D3, and D5 from the vertical rotational axis 42. In a particular example, while the spindle 30 is rotating, each of the pyrometers 70 can measure the temperature of an annular portion of the support element at a corresponding radial distance, and such measured temperature can be an average of the measured temperature of the entire annular portion during at least one complete rotation of the support element.

In the embodiment shown in FIG. 1, a calibrating pyrometer 80 can be removably installed into one of the viewports 60. The calibrating pyrometer can be adapted to measure the temperature of the support element 40 and/or wafers supported thereon. Such temperature measurements can be used as an input to help determine the degree of accuracy of one or more of the operating pyrometers 70. The calibrating pyrometer 80 can be any type of pyrometer that can be adapted to be removably installed into one of the viewports 60. In a particular example, the calibrating pyrometer 80 can be a high accuracy pyrometer. For example, such a calibrating pyrometer 80 can have accuracy within approximately ±1.5° C. and repeatability from one calibrating pyrometer to another within approximately ±0.25° C. Such a calibrating pyrometer 80 can have a drift of up to approximately 0.05° C. per year. Such a calibrating pyrometer 80 can be removed from the chamber 12 and periodically calibrated against a known standard as, for example, a standard device that itself is traceable to a national or international standard such as a NIST-traceable black-body standard.

The calibrating pyrometer 80 can be removably installed, in sequence, into three of the viewports 60L, including the viewports 1L, 3L, and 5L. As shown in FIG. 1, the calibrating pyrometer 80 can be sequentially located in the positions A, B, and C, installed into the corresponding viewports 1L, 3L, and 5L.

When the calibrating pyrometer 80 is located in the position A installed into the viewport 1L, the calibrating pyrometer can measure the temperature of the support element 40 at the radial distance D1 from the vertical rotational axis 42 of the support element. This radial distance D1 is the same radial distance at which the operating pyrometer 71 installed into the viewport 1R is adapted to measure the temperature of the support element 40. Consequentially, while the spindle 30 is rotating, the calibrating pyrometer 80 installed in the viewport 1L and the operating pyrometer 71 installed in the viewport 1R can measure the temperature of a particular annular portion of the support element 40 at the radial distance D1, and such measured temperatures can be averages of the measured temperature of the entire annular portion during at least one complete rotation of the support element.

Similarly, when the calibrating pyrometer 80 is located in the positions B or C installed into the respective viewports 3L or 5L, the calibrating pyrometer can measure the temperature of the support element 40 at the respective radial distances D3 or D5 from the vertical rotational axis 42 of the support element. The radial distances D3 and D5 are the same radial distances at which the respective operating pyrometers 73 and 75 installed into the viewports 3R and 5R are adapted to measure the temperature of the support element 40.

A control system 90 can be provided that can be adapted to receive temperature measurement readings from the operating pyrometers 70 during operation of the apparatus 10, and the control system can store such temperature measurement readings in a memory 92. In one embodiment, the control system 90 can adjust the heating of one or more zones of the heating element 50 in response to temperature measurements recorded by the operating pyrometers 70. In a particular example, the control system 90 can be adapted to receive temperature measurement readings from the operating pyrometers 70 and the calibrating pyrometer 80 during calibration of the operating pyrometers, and the control system can store such temperature measurement readings in the memory 92.

In operation, in a temperature measurement process according to an embodiment of the invention, the calibrating pyrometer 80 can be removably installed at the first calibrating position A engaged in the optical viewport 1L. While the calibrating pyrometer 80 is installed at the first calibrating position A, the calibrating pyrometer is adapted to receive radiation from a first portion of the support element 40 at a first radial distance D1 from the rotational axis 42 of the support element. As described above, a first operating pyrometer 71 can be installed at a first operating position engaged in the optical viewport 1R, such that the operating pyrometer 71 is adapted to receive radiation from the first portion of the support element 40 at the first radial distance D1 from the rotational axis 42. In an exemplary embodiment, the operating pyrometers 71, 73, and 75 can remain installed in corresponding viewports 60R during the entire temperature measurement process (i.e., without being removed from the reactor 12).

Then, the reactor 12 can be heated by the heating element 50 until the reactor reaches a pyrometer calibration temperature, for example, between 500 and 1100° C. The calibration temperature desirably is close to the operating temperature during the wafer treatment process to be performed in the reactor 12. Next, the support element 40 can be rotated about the rotational axis 42. In one embodiment, the support element 40 can be rotated at a speed between 50 and 1500 revolutions per minute, although in other embodiments, the support element can be rotated at other speeds. While the support element 40 is rotating about the rotational axis 42 thereof, an operator or the optional control system 90 can obtain first operating temperature measurements from the operating pyrometer 71 installed at the viewport 1R, and the operator or the control system can obtain first calibrating temperature measurements from the calibrating pyrometer 80 installed at the viewport 1L. In a particular embodiment, the temperature measurements from the operating pyrometer 71 and the calibrating pyrometer 80 located at the first calibrating position A can be obtained simultaneously.

As the support element 40 rotates, spots on the support element disposed at the same radial distance from the central axis 42 but at different angular locations around the axis pass the locations monitored by the calibrating pyrometer and first operating pyrometer 71. In the particular arrangement shown, the viewport 1L is offset by 180° or one-half of a revolution from the viewport 1R, and the locations monitored by the pyrometers 71 and 80 are likewise offset from one another by one-half of a revolution. Preferably, the temperature measurements are taken while the reaction chamber 12 is in a stable condition, so that the temperature is not changing over time or is oscillating within an acceptable tolerance of a desired temperature. Temperature differences between circumferentially separated locations on the support element 40 will not significantly affect temperature readings from the pyrometers 71 and 80 because the temperature readings are averaged across several complete rotations of the support element.

In a preferred embodiment, pyrometer calibration can be performed using a support element that is a blank wafer carrier that does not have any wafer-holding pockets or wafers thereon, or an empty support element 40 (i.e., bearing no wafers thereon). In an alternative embodiment, a support element 40 having wafers thereon can be used for the calibration process. In one example of such an embodiment, the calibrating pyrometer 80 can have the ability to separate wafer temperature data from support element temperature data using reflectivity or temperature differences between the wafers and the support element. The average temperature of either the wafers or the support element 40 can be used for calibration of the operating pyrometers 70. In a particular embodiment, the ability to separate wafer temperature data from support element temperature data may already be present in one or more of the operating pyrometers 70.

Then, the calibrating pyrometer 80 can be removably installed at the second calibrating position B engaged in the viewport 3L. While the calibrating pyrometer 80 is installed at the second calibrating position B, the calibrating pyrometer is adapted to receive radiation from a second portion of the support element 40 at a second radial distance D3 from the rotational axis 42 of the support element. As described above, a second operating pyrometer 73 can be installed at a second operating position engaged in the viewport 3R, such that the operating pyrometer 73 is adapted to receive radiation from the second portion of the support element 40 at the second radial distance D3 from the rotational axis 42.

While the support element 40 is rotating about the rotational axis 42 thereof, the operator or the control system 90 can obtain second operating temperature measurements from the operating pyrometer 73 installed at the viewport 3R, and the operator or the control system can obtain second calibrating temperature measurements from the calibrating pyrometer 80 installed at the viewport 3L. In a particular embodiment, the temperature measurements from the operating pyrometer 73 and the calibrating pyrometer 80 located at the second calibrating position B can be obtained by the control system simultaneously.

Then, the calibrating pyrometer 80 can be removably installed at the third calibrating position C engaged in the viewport 5L. While the calibrating pyrometer 80 is installed at the third calibrating position C, the calibrating pyrometer is adapted to receive radiation from a third portion of the support element 40 at a third radial distance D5 from the rotational axis 42 of the support element. As described above, a third operating pyrometer 75 can be installed at a third operating position engaged in the viewport 5R, such that the operating pyrometer 75 is adapted to receive radiation from the third portion of the support element 40 at the third radial distance D5 from the rotational axis 42.

While the support element 40 is rotating about the rotational axis 42 thereof, the operator or the control system can obtain third operating temperature measurements from the operating pyrometer 75 installed at the viewport 5R, and the operator or the control system can obtain third calibrating temperature measurements from the calibrating pyrometer 80 installed at the viewport 5L. In a particular embodiment, the temperature measurements from the operating pyrometer 75 and the calibrating pyrometer 80 located at the third calibrating position C can be obtained by the control system simultaneously. After the first, second, and third calibrating and operating temperature measurements are obtained, the calibrating pyrometer 80 can be removed from the viewport 5L and from the chamber 12.

In an exemplary embodiment, the temperature measurement process described above can be performed during chemical vapor deposition operation of the reactor (e.g., as described below).

In a preferred embodiment, the calibration of each of the operating pyrometers 71, 73, and 75 can be performed while the apparatus 10 is operating in a temperature control mode of operation, in which the apparatus adjusts the current to the heating elements 50 based on the temperature readings from the operating pyrometers 70. In one example, the recording of calibration temperature measurements for each of the operating pyrometers 70 can be performed before the adjustment of the calibration of any of the pyrometers. Alternatively, the recording of calibration temperature measurements and the adjustment of the calibration for each pyrometer can be performed in series, i.e., before recording the calibration temperature measurements of the next operating pyrometer. In either procedure, it is preferred that after adjusting the calibration of each pyrometer 70, the operator can wait for the temperature of the reactor to stabilize before moving on to either recording calibration temperature measurements or adjusting the calibration of the next pyrometer, depending on which procedure is used.

In an alternative embodiment, the calibration of each of the operating pyrometers 71, 73, and 75 can be performed while the apparatus 10 is operating in a current control mode of operation, in which the current into filaments of the operating pyrometers 70 is controlled to particular values, and the operating pyrometers are not in the control loop. Similar to the procedures described above with respect to temperature control, the recording of calibration temperature measurements for each of the operating pyrometers 70 can be performed before the adjustment of the calibration of any of the pyrometers, or alternatively, the recording of calibration temperature measurements and the adjustment of the calibration for each pyrometer can be performed in series.

In another alternative embodiment, the calibration parameters of the operating pyrometers 70 are not adjusted. Rather, the control system 90 can store in the memory 92 a mapping or look-up table of one or more of the less accurate first, second, and third operating temperature measurements obtained from the respective operating pyrometers 71, 73, and 75 to the more accurate first, second, and third calibrating temperature measurements obtained from the calibrating pyrometer 80. In this way, the temperature mappings can allow the control system 90 to correct the temperature measurements obtained by one or more of the operating pyrometers 70 during a wafer treatment process such as that described below.

In one embodiment, each of the first, second, and third operating temperature measurements and each of the first, second, and third calibrating temperature measurements can be single temperature readings at a single temperature that may be important to the wafer treatment process. In another embodiment, each of the first, second, and third operating temperature measurements and each of the first, second, and third calibrating temperature measurements can be an average of a plurality of temperature readings at a single temperature. In a particular example, the calibrating process can be performed at approximately 800° C.

In yet another embodiment, each of the first, second, and third operating temperature measurements and each of the first, second, and third calibrating temperature measurements can be plurality of temperature readings spread out over a range of temperatures, such that a mapping of the accuracy of each operating pyrometer 70 relative to the calibrating pyrometer 80 can be established over a typical wafer treatment process operating temperature range of the chamber 12.

The steps discussed above can be performed while the reactor is in use processing wafers. Thus, the entry opening (not shown) can be opened by lowering a shutter (not shown). Then, a support element bearing wafers can be loaded from the antechamber (not shown) into the chamber 12 and can be placed in an operative position on the spindle 30. In this condition, the top surfaces of the wafers can face upwardly, towards the gas inlet manifold 14. Then, the entry opening can be closed. The heating element 50 can be actuated, and the rotary drive 38 can operate to turn the spindle 30 and hence the support element 40 around the central axis 32. Typically, the spindle 30 is rotated at a rotational speed from about 50-1500 revolutions per minute.

Process gas supply units (not shown) can be actuated to supply gases through the gas inlet manifold 14. The gases can pass downwardly toward the support element 40, over the top surfaces of the wafers, and downwardly around a periphery of the support element to the exhaust system 52. Thus, the top surfaces of the wafers can be exposed to a process gas including a mixture of the various gases supplied by the various process gas supply units. Most typically, the process gas at the top surface is predominantly composed of the carrier gas supplied by a carrier gas supply unit (not shown).

During the wafer treatment process, the operating pyrometers 70 can record temperature measurements that can serve as an input to control the heating element 50. In embodiments having a multi-zone heating element 50, each of a plurality of pyrometers 70 can record temperature measurements at a particular radial distance from the vertical rotational axis 42 that can control a corresponding zone of the multi-zone heating element.

The process can continue until the desired treatment of the wafers has been completed. Once the process has been completed, the entry opening can be opened, and the wafers can be removed from the support element 40. Finally, the treated wafers can be replaced with new wafers for the next operational cycle.

In the embodiments shown, each pyrometer 70 and 80 is adapted to measure the temperature of the support element 40 and/or wafers supported thereon at a radial distance from the vertical rotational axis 42 of the support element that is the same as the radial distance between the central axis 32 of the spindle 30 and the corresponding viewport 60, such that the pyrometer 70 or 80 is adapted to receive radiation traveling at an angle α that is approximately a right angle (approximately 90°). In other embodiments, each pyrometer 70 and 80 can be adapted to measure the temperature of the support element 40 and/or wafers supported thereon at a radial distance from the rotational axis 42 of the support element that is different from the radial distance between the central axis 32 of the spindle 30 and the corresponding viewport 60, such that the pyrometer 70 or 80 is adapted to receive radiation traveling at an angle α that is not approximately a right angle, such as 30°, 45°, 60°, 75°, or any other angle. In particular embodiments, either, both, or neither of the calibrating pyrometer 80 and a corresponding pyrometer 70 may receive radiation traveling at an angle α that is approximately a right angle.

In such embodiments where the angle α is not approximately a right angle, the calibrating pyrometer 80 can be located at a different radial distance from the vertical rotational axis 42 of the support element 40 than the corresponding operating pyrometer 70, so long as both the calibrating pyrometer and the corresponding operating pyrometer can receive radiation traveling from the support element at the same radial distance (e.g., D1) from the vertical rotational axis.

As shown, the operating pyrometers 70 are installed into right-side viewports 60R, and the calibrating pyrometer 80 can be removably installed into corresponding ones of the left-side viewports 60L. In other embodiments, each operating pyrometer 70 can be installed into any of the viewports 60, and the calibrating pyrometer 80 can be removably installed into any corresponding one of the viewports 60 that can receive radiation traveling from the support element at the same radial distance from the vertical rotational axis 42 as that received by the respective operating pyrometer 70.

In one example, the operating pyrometers 70 can be installed into some of the left-side viewports 60L, and the calibrating pyrometer 80 can be removably installed into corresponding ones of the right-side viewports 60R. In another example, some of the operating pyrometers 70 (e.g., the operating pyrometers 71 and 73) can be installed into some of the right-side viewports 60R, and others of the operating pyrometers (e.g., the operating pyrometer 75) can be installed into left-side viewports 60L, and the calibrating pyrometer 80 can be removably installed into corresponding ones of the viewports 60 that can receive radiation traveling from the support element at the same radial distance from the vertical rotational axis 42 as that received by the respective operating pyrometer 70.

It is desirable that each of the viewports 60 into which the calibrating pyrometer 80 will be installed (e.g., the left-side viewports 1L, 3L, and 5L) is free of significant parasitic deposition thereon. Before the calibrating pyrometer 80 is installed into a particular viewport 60, it is desirable that the particular viewport be cleaned to remove such parasitic deposition.

In a particular embodiment, the operating pyrometer 70 and the calibrating pyrometer 80 can be aimed to receive radiation traveling from the same single location on the support element, rather than from separate locations at the same radial distance from the vertical rotational axis 42. In such an embodiment, rather than having an operating pyrometer and the calibrating pyrometer 80 installed in different viewports 60, an operating pyrometer 70 and the calibrating pyrometer 80 can be installed in the same viewport. Such an embodiment may require modification of the chamber 12 to include a viewport large enough to accommodate the installation of both an operating pyrometer 70 and the calibrating pyrometer 80. Also, such an embodiment may require the operating pyrometer 70 and the calibrating pyrometer 80 to be tilted relative to the vertical rotational axis 42 and to have increased temperature measurement uncertainty.

Figure 2:
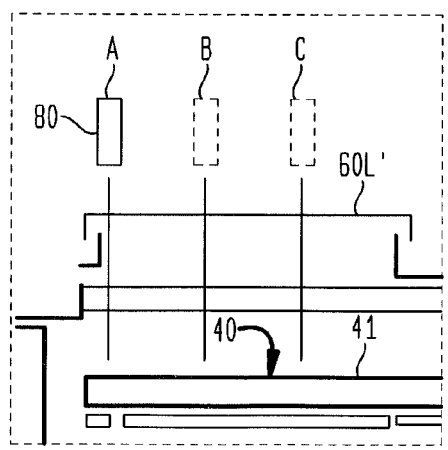
FIG. 2 is a partial sectional view depicting an alternate viewport embodiment for the chemical vapor deposition apparatus shown in FIG. 1.

Referring now to FIG. 2, an alternate viewport embodiment for the chemical vapor deposition apparatus 10 shown in FIG. 1 is shown. In this embodiment, the calibrating pyrometer 80 can be removably installed into one or more radially-extensive optical viewports 60L', rather than being sequentially installed into separate viewports 1L, 3L, and 5L. As used herein, a radially-extensive viewport is a viewport that has the capability of changing the radial position of an installed pyrometer without removing the pyrometer from the viewport. Such a radially-extensive viewport can include radially-extending rails that allow a pyrometer to slide thereon from one radial position to another without removal from the viewport.

In the embodiment shown in FIG. 2, the calibrating pyrometer 80 can be installed into a radially-extensive viewport 60L' on rails (not shown) extending substantially parallel to the top surface 41 of the support element 40 along at least a portion of a radius of the support element, such that the calibrating pyrometer can be controlled using a micrometer mount. In one example, the calibrating pyrometer 80 can be quickly moved on the rails along at least a portion of the radius of the support element 40 to form a map of temperature measurement recording of a radially-extensive portion of the support element. In another example, the radially-extensive viewport 60L' can extend along an entire radius of the support element, such that the calibrating pyrometer 80 can be moved on the rails along an entire radius of the support element 40 to perform temperature measurement recordings of any radial location on the top surface 41 of the support element.

In a particular embodiment, there can be two or more radially-extensive viewports 60L' along the same radius of the support element 40 or along different radii at different angular locations of the support element, and the calibrating pyrometer 80 can be sequentially installed into each radially-extensive viewport for recording of temperature measurements along two or more radially-extensive portions of the support element.

In an alternative example, the calibrating pyrometer 80 can be moved within the radially-extensive viewport 60L' along the rails to the discrete locations A, B, and C, such that the calibrating pyrometer can measure the temperature of particular portions of the support element 40 at the radial distances D1, D3, and D5 at which the respective operating pyrometers 71, 73, and 75 are adapted to record temperature measurements.

The calibrating pyrometer 80 may be removably installed in the viewport 60L' only at times during which a user desires to recalibrate the operating pyrometers 70, or the calibrating pyrometer can remain installed in the viewport 60L' during wafer treatment cycles and can be periodically removed for re-calibration against a known standard.

The in-situ pyrometer calibration systems and methods according to the invention, as described above, can have several potential advantages compared to conventional pyrometer calibration methods. For example, compared to conventional pyrometer re-calibration processes, the operating pyrometers 70 do not need to be removed from the chamber 12 to be re-calibrated. Also, as described above, the temperature measurement process according to the invention can compensate for errors related to pyrometer installation in the chamber 12 and conditions in the chamber such as parasitic deposition on the viewports 60, as described above.

The invention can be applied in various wafer treatment processes using a rotating disc reactor as, for example, chemical vapor deposition, chemical etching of wafers, and the like. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. It will be appreciated that the various dependent claims and the features set forth therein can be combined in different ways than presented in the initial claims. It will also be appreciated that the features described in connection with individual embodiments may be shared with others of the described embodiments.

The invention claimed is:

1. A method of in-situ pyrometer calibration for a wafer treatment reactor, comprising:
   (a) positioning a calibrating pyrometer at a first calibrating position so that the calibrating pyrometer is adapted to receive radiation from a first portion of a wafer support element at a first radial distance from a rotational axis of the wafer support element;
   (b) heating the reactor until the reactor reaches a pyrometer calibration temperature;
   (c) rotating the support element about the rotational axis; and
   (d) while the support element is rotating about the rotational axis, obtaining first operating temperature measurements from a first operating pyrometer installed at a first operating position so that the first operating pyrometer is adapted to receive radiation from the first portion of the wafer support element at the first radial distance from the rotational axis of the wafer support element; and
   (e) while the support element is rotating about the rotational axis, obtaining first calibrating temperature measurements from the calibration pyrometer.

2. The method as claimed in claim 1, wherein steps (d) and (e) are performed simultaneously.

3. The method as claimed in claim 1, wherein steps (a) through (e) are performed without removing the first operating pyrometer from the reactor.

4. The method as claimed in claim 1, wherein steps (d) and (e) are performed during operation of the reactor to treat wafers.

5. The method as claimed in claim 1, wherein the wafer support element is a blank wafer carrier that does not have wafer-holding pockets or wafers thereon.

6. The method as claimed in claim 1, wherein the operation of the reactor to treat wafers includes chemical vapor deposition.

7. The method as claimed in claim 1, further comprising adjusting calibration parameters of the first operating pyrometer based on the temperature measurements obtained from the first operating pyrometer and the calibration pyrometer.

8. The method as claimed in claim 1, further comprising storing a look-up table in a memory of the wafer treatment reactor, the look-up table including a mapping of at least some of the first operating temperature measurements with corresponding ones of the first calibrating temperature measurements.

9. The method as claimed in claim 1, wherein the pyrometer calibration temperature is a first pyrometer calibration temperature, further comprising:
   (f) heating the reactor until the reactor reaches a second pyrometer calibration temperature;
   (g) while the support element is rotating about the rotational axis, obtaining second operating temperature measurements from the first operating pyrometer; and
   (h) while the support element is rotating about the rotational axis, obtaining second calibrating temperature measurements from the calibration pyrometer.

10. The method as claimed in claim 1, further comprising:
    (f) moving the calibrating pyrometer to a second calibrating position so that the calibrating pyrometer is adapted to receive radiation from a second portion of the wafer support element at a second radial distance from the rotational axis of the wafer support element; and
    (g) while the support element is rotating about the rotational axis, obtaining second operating temperature measurements from a second operating pyrometer installed at a second operating position so that the second operating pyrometer is adapted to receive radiation from the second portion of the wafer support element at the second radial distance from the rotational axis of the wafer support element; and
    (h) while the support element is rotating about the rotational axis, obtaining second calibrating temperature measurements from the calibration pyrometer.

11. The method as claimed in claim 10, further comprising:
    before step (g), adjusting calibration parameters of the first operating pyrometer based on the first operating temperature measurements and the first calibrating temperature measurements; and
    after step (h), adjusting calibration parameters of the second operating pyrometer based on the second operating temperature measurements and the second calibrating temperature measurements.

12. The method as claimed in claim 10, further comprising, after step (h), adjusting calibration parameters of the first and second operating pyrometers based on the temperature measurements obtained from the operating pyrometers and the calibration pyrometer.

13. The method as claimed in claim 10, wherein the first and second operating pyrometers are engaged in respective first and second operating optical viewports of the reactor.

14. The method as claimed in claim 13, wherein the positioning step is performed such that the calibrating pyrometer is engaged in a first calibrating optical viewport of the reactor.

15. The method as claimed in claim 14, wherein the moving step is performed such that the calibrating pyrometer is engaged in a second calibrating optical viewport of the reactor.

16. The method as claimed in claim 13, wherein the positioning step is performed such that the calibrating pyrometer is engaged in a radially-extensive calibrating optical viewport, and the moving step is performed such that the calibrating pyrometer is moved along the radially-extensive calibrating optical viewport from the first calibrating position to the second calibrating position.

17. The method as claimed in claim 1, wherein the heating step is performed by a multi-zone heating system for the wafer support element.

18. An in-situ pyrometer calibration system for a wafer treatment reactor, the system comprising:
(a) a wafer support element having a rotational axis;
(b) a heating element for the wafer support element;
(c) a first operating pyrometer installed at a first operating position so that the first operating pyrometer is adapted to receive radiation from a first portion of the wafer support element at a first radial distance from the rotational axis of the wafer support element; and
(d) a calibrating pyrometer positioned at a first calibrating position so that the calibrating pyrometer is adapted to receive radiation from the first portion of the wafer support element at the first radial distance from the rotational axis of the wafer support element.

19. The system as claimed in claim 18, wherein the first operating pyrometer and the calibrating pyrometer are adapted to simultaneously take temperature measurements from the first portion of the wafer support element at the first radial distance from the rotational axis of the wafer support element.

20. The system as claimed in claim 18, further comprising a second operating pyrometer installed at a second operating position so that the second operating pyrometer is adapted to receive radiation from a second portion of the wafer support element at a second radial distance from the rotational axis of the wafer support element,
wherein the calibrating pyrometer is adapted to be positioned at a second calibrating position so that the calibrating pyrometer in the second calibrating position is adapted to receive radiation from the second portion of the wafer support element at the second radial distance from the rotational axis of the wafer support element.

21. The system as claimed in claim 20, further comprising first and second operating optical viewports, wherein the first and second operating pyrometers are engaged in the respective first and second operating optical viewports.

22. The system as claimed in claim 21, further comprising first and second calibrating optical viewports, wherein the calibrating pyrometer is adapted to be engaged in the first calibrating optical viewport when the calibrating pyrometer is positioned at the first calibrating position, and the calibrating pyrometer is adapted to be engaged in the second calibrating optical viewport of the reactor when the calibrating pyrometer is positioned at the second calibrating position.

23. The system as claimed in claim 21, further comprising a radially-extensive calibrating optical viewport, wherein the calibrating pyrometer is adapted to slide within the radially-extensive calibrating optical viewport between the first and second calibrating positions.

24. The system as claimed in claim 18, wherein the heating element is a multi-zone heating system.

* * * * *